United States Patent [19]

Itabashi

[11] Patent Number: 5,648,864
[45] Date of Patent: Jul. 15, 1997

[54] OPTICAL SCANNER

[75] Inventor: Akihisa Itabashi, Mitaka, Japan

[73] Assignee: Ricoh Company, Ltd., Tokyo, Japan

[21] Appl. No.: 606,350

[22] Filed: Feb. 23, 1996

[30] Foreign Application Priority Data

Mar. 23, 1995 [JP] Japan ............ 7-063930

[51] Int. Cl.$^6$ .............................. G02B 26/08
[52] U.S. Cl. ............... 359/205; 359/206; 359/208; 359/216; 359/217
[58] Field of Search .................. 359/205–208, 359/216–219, 662, 727, 728; 250/234–236; 347/258–261

[56] References Cited

U.S. PATENT DOCUMENTS

| | | | |
|---|---|---|---|
| 5,015,050 | 5/1991 | Itabashi | 359/206 |
| 5,062,679 | 11/1991 | Itabashi | 359/206 |
| 5,064,261 | 11/1991 | Itabashi | 359/206 |
| 5,221,986 | 6/1993 | Itabashi | 359/206 |
| 5,353,047 | 10/1994 | Nakamura et al. | 359/208 |
| 5,408,095 | 4/1995 | Atsuumi et al. | 359/208 |
| 5,426,298 | 6/1995 | Sakuma et al. | 250/235 |
| 5,475,522 | 12/1995 | Itabashi et al. | 359/208 |
| 5,504,613 | 4/1996 | Itabashi et al. | 359/210 |
| 5,557,448 | 9/1996 | Endo et al. | 359/208 |

FOREIGN PATENT DOCUMENTS

| | | | |
|---|---|---|---|
| 63-55517 | 5/1988 | Japan | 359/208 |
| 63-136017 | 6/1988 | Japan | 359/208 |

Primary Examiner—James Phan
Attorney, Agent, or Firm—Oblon, Spivak, McClelland, Maier & Neustadt, P.C.

[57] ABSTRACT

An image forming optical system for an equal speed scan converges a deflected light beam as a light spot onto a scanned face to perform an optical scanning operation at an equal speed. The image forming optical system has an fθ lens having an fθ function in a main scan-corresponding direction and converging the deflected light beam onto the scanned face in the main scan-corresponding direction. The image forming optical system also has a concave reflecting mirror having positive refracting power only in a cross scan-corresponding direction and converging the deflected light beam onto the scanned face in the cross scan-corresponding direction in cooperation with the fθ lens. A radius of curvature of the concave reflecting mirror in the cross scan-corresponding direction is increased from a central region thereof toward both end portions of the concave reflecting mirror in a longitudinal direction thereof in accordance with a predetermined formula of the second degree at a deflection angle θ of the deflected light beam deflected by the rotary polygon mirror.

6 Claims, 3 Drawing Sheets

$\theta = 28.5°$ $-0.001f_M$    $0.001f_M$ $\theta = -28.5°$
FIELD CURVATURE $\theta = 28.5°$ $-0.001f_M$    $0.001f_M$ $\theta = -28.5°$
FIELD CURVATURE

FIELD CURVATURE

LINEARITY (%)

FIELD CURVATURE

OPTICAL SCANNER

BACKGROUND OF THE INVENTION

1. Field of the Invention

The present invention relates to an optical scanner using a rotary polygon mirror.

2. Description of the Related Art

In an optical scanner, a parallel light beam from a light source device is deflected on a rotary polygon mirror and is converged as a light spot on a scanned face by an image forming lens system to perform an optical scanning operation. The optical scanner is widely known in association with an optical printer, a digital copying machine, etc.

Recently, a high quality of an image in an image outputting device using such an optical scanner is strongly required. Further, there are various kinds of proposals for stabilizing a diameter of the light spot scanning the scanned face in the optical scanner.

The diameter of the light spot is mainly varied by a shift between the scanned face and an image forming position of the light spot caused by field curvature. Therefore, stabilization of the spot diameter depends on how to preferably correct field curvature in the image forming lens system. A so-called face inclination is caused as a problem when the rotary polygon mirror is used as an optical deflector. To solve this problem, the image forming lens system is constructed by an anamorphic optical system having different refracting powers in a main scan-corresponding direction and a cross scan-corresponding direction. In this case, the main scan-corresponding direction is a direction parallel to a main scanning direction and corresponding to this main scanning direction on a virtual optical path provided by linearly developing an optical path from a light source to the scanned face along an optical axis of the optical system. The cross scan-corresponding direction is a direction parallel to a cross scanning direction and corresponding to this cross scanning direction on this virtual optical path. The image forming lens system may have an fθ function to perform the optical scanning operation using the light spot at an equal speed. However, it is difficult to preferably satisfy both field curvatures in the main scanning direction and the cross scanning direction while requirements for various kinds of optical performances such as the anamorphic optical system, the fθ function, etc. are satisfied.

An optical scanning optical system considering such a situation is shown in Japanese Patent Application Laying Open (KOKAI) No. 3-54513. In this optical system, a linear image extending in the main scan-corresponding direction is formed in the vicinity of a deflecting reflecting face of the rotary polygon mirror. An image forming optical system for converging a light beam deflected on the deflecting reflecting face onto the scanned face is constructed by a spherical lens system and a cylindrical mirror. A radius of curvature of the cylindrical mirror in the cross scan-corresponding direction is changed in the main scan-corresponding direction so that field curvature in the cross scanning direction is corrected.

With respect to the rotary polygon mirror, no rotating axis of the deflecting reflecting face is in conformity with an axis of the deflecting reflecting face. Therefore, the relation in position between the deflecting reflecting face and a linear image extending in the main scan-corresponding direction is asymmetrically changed with respect to an image height 0 of the light spot as the deflecting reflecting face is rotated. This problem is called sag.

No problem of sag is considered in the optical scanning optical system shown in the above Japanese Patent Application Laying Open (KOKAI) No. 3-54513. Therefore, field curvature can be preferably corrected on one main scanning side with respect to the image height 0 of the light spot, but is increased on the other main scanning side.

SUMMARY OF THE INVENTION

It is therefore an object of the present invention to provide a novel optical scanner for preferably correcting field curvature although there is a problem of sag.

In accordance with a first construction of the present invention, the above object can be achieved by an optical scanner in which a parallel light beam from a light source device is formed by an image forming element as a linear image extending in a main scan-corresponding direction and is deflected at an equal angular velocity by a rotary polygon mirror having a deflecting reflecting face in the vicinity of the linear image; and the deflected light beam is converged as a light spot on a scanned face by an image forming optical system for an equal speed scan to perform an optical scanning operation at an equal speed;

the optical scanner being constructed such that the image forming optical system for an equal speed scan has an fθ lens having an fθ function in the main scan-corresponding direction and converging the deflected light beam onto the scanned face in the main scan-corresponding direction;

the image forming optical system also has a concave reflecting mirror having positive refracting power only in a cross scan-corresponding direction and converging the deflected light beam onto the scanned face in the cross scan-corresponding direction in cooperation with the fθ lens;

a radius of curvature of the concave reflecting mirror in the cross scan-corresponding direction is increased from a central region thereof toward both end portions of the concave reflecting mirror in a longitudinal direction thereof in accordance with a predetermined formula of the second degree at a deflection angle θ of the deflected light beam deflected by the rotary polygon mirror; and a portion of the concave reflecting mirror minimizing the curvature radius is shifted by a predetermined distance in a predetermined direction from the position of an optical axis of the fθ lens in the main scan-corresponding direction so as to correct field curvature in a cross scanning direction along an effective scanning region.

In accordance with a fourth construction of the present invention, the above object can be also achieved by an optical scanner in which a parallel light beam from a light source device is formed by an image forming element as a linear image extending in a main scan-corresponding direction and is deflected at an equal angular velocity by a rotary polygon mirror having a deflecting reflecting face in the vicinity of the linear image; and the deflected light beam is converged as a light spot on a scanned face by an image forming optical system for an equal speed scan to perform an optical scanning operation at an equal speed;

the optical scanner being constructed such that the image forming optical system for an equal speed scan has an fθ lens having an fθ function in the main scan-corresponding direction and converging the deflected light beam onto the scanned face in the main scan-corresponding direction;

the image forming optical system also has a concave reflecting mirror having positive refracting power only in a cross scan-corresponding direction and converging the deflected light beam onto the scanned face in the cross scan-corresponding direction in cooperation with the fθ lens;

a radius of curvature of the concave reflecting mirror in the cross scan-corresponding direction is increased from a central region thereof toward both end portions of the concave reflecting mirror in a longitudinal direction thereof in accordance with a predetermined formula of the second degree at a deflection angle θ of the deflected light beam deflected by the rotary polygon mirror; and changes in curvature radius of the concave reflecting mirror in the longitudinal direction provided in accordance with a formula of the second degree are asymmetrical on right-hand and left-hand sides with a minimum portion of the curvature radius as a boundary.

In each of the above constructions, the optical scanner can preferably correct field curvature although there is a problem of sag.

Further objects and advantages of the present invention will be apparent from the following description of the preferred embodiments of the present invention as illustrated in the accompanying drawings.

DESCRIPTION OF THE PREFERRED EMBODIMENTS

Figure 1A:
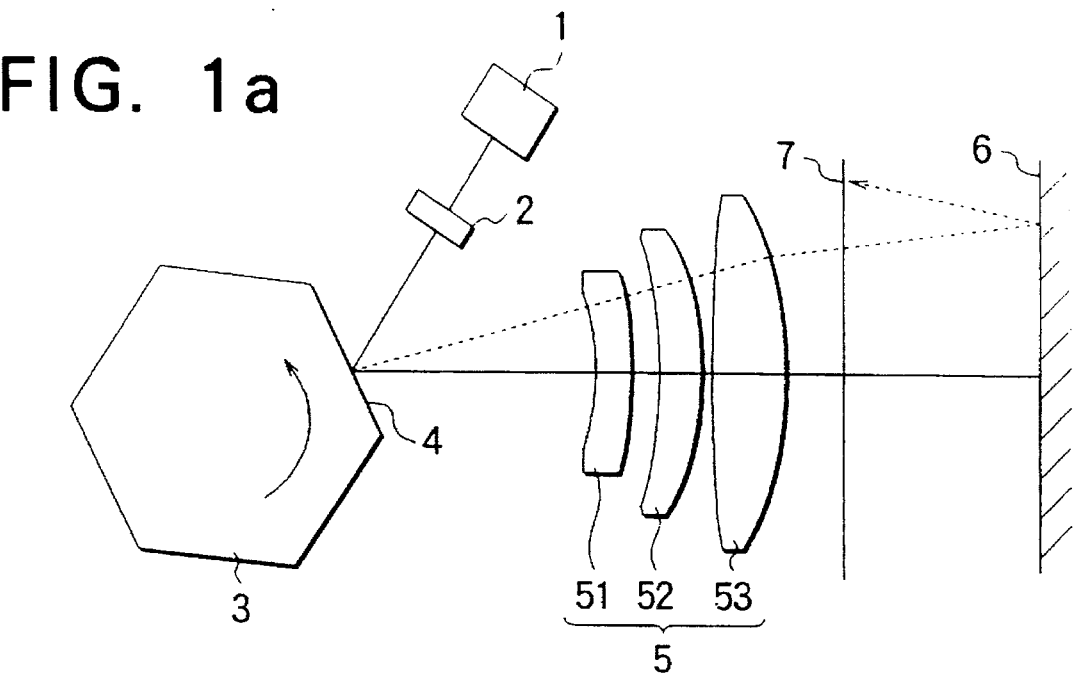
FIGS. 1a and 1b are views for explaining an optical scanner in the present invention.

The preferred embodiments of an optical scanner in the present invention will next be described in detail with reference to the accompanying drawings.

In an optical scanner of the present invention, a parallel light beam from a light source device is formed by an image forming element as a linear image extending in a main scan-corresponding direction and is deflected at an equal angular velocity by a rotary polygon mirror having a deflecting reflecting face in the vicinity of the linear image. The deflected light beam is converged as a light spot on a scanned face by an image forming optical system for an equal speed scan to perform an optical scanning operation at an equal speed.

The optical scanner has the following basic construction.

Namely, an image forming optical system for an equal speed scan has an fθ lens and a concave reflecting mirror.

The fθ lens has an fθ function in the main scan-corresponding direction and converges the deflected light beam onto the scanned face in the main scan-corresponding direction. Accordingly, the deflected light beam is converged onto the scanned face by only the fθ lens with respect to the main scan-corresponding direction.

The concave reflecting mirror has positive refracting power only in a cross scan-corresponding direction and converges the deflected light beam onto the scanned face in the cross scan-corresponding direction in cooperation with the fθ lens.

Accordingly, the image forming optical system for an equal speed scan sets a forming position of the linear image and a position of the scanned face to a substantially conjugate relation in geometrical optics with respect to the cross scan-corresponding direction. A radius of curvature of the concave reflecting mirror in the cross scan-corresponding direction is increased from a central region thereof toward both end portions of the concave reflecting mirror in a longitudinal direction thereof in accordance with a predetermined formula of the second degree at a deflection angle θ of the deflected light beam deflected by the rotary polygon mirror. The central region of the concave reflecting mirror is a length region including a central portion in the longitudinal direction of the concave reflecting mirror parallel to the main scan-corresponding direction.

Since the curvature radius of the concave reflecting mirror in the cross scan-corresponding direction is increased from the central region toward the both end portions in the longitudinal direction, the shape of a mirror surface of the concave reflecting mirror is similar to a surface shape of a so-called drum wheel.

In such a basic construction, the first construction of the present invention has the following features.

Namely, a portion of the concave reflecting mirror minimizing the curvature radius is shifted by a predetermined distance in a predetermined direction from the position of an optical axis of the fθ lens in the main scan-corresponding direction.

The portion of the concave reflecting mirror minimizing the curvature radius may be set to a central portion in the longitudinal direction. The portion of the concave reflecting mirror minimizing the curvature radius may be set to be shifted from the central portion in the longitudinal direction. In the former case, the concave reflecting mirror itself is shifted in a second construction of the present invention such that the position of the central portion in the longitudinal direction providing the minimum curvature radius is shifted by the predetermined distance in the predetermined direction from the position of the optical axis of the fθ lens in the main scan-corresponding direction.

In the latter case, a formula of the second degree representing a change in curvature radius of the concave reflecting mirror includes a first degree term. The concave reflecting mirror is formed in a third construction of the present invention such that the portion of the concave reflecting mirror minimizing the curvature radius is shifted by the predetermined distance in the predetermined direction from the central portion of the concave reflecting mirror in the longitudinal direction. The concave reflecting mirror itself is arranged such that the central portion of the concave reflecting mirror is in conformity with the position of the optical axis of the fθ lens.

In the above basic construction, the optical scanner having the fourth construction of the present invention has the following features.

Namely, changes in curvature radius of the concave reflecting mirror in the longitudinal direction provided in accordance with a formula of the second degree are asymmetrical on right-hand and left-hand sides with a minimum portion of the curvature radius as a boundary. In this case, the minimum portion of the curvature radius may be in conformity with the optical axis of the fθ lens, or may be shifted from this optical axis.

In accordance with a fifth construction of the present invention, the concave reflecting mirror in each of the first to fourth constructions has a reflecting face formed in a concave surface portion of a base formed by plastic. In accordance with a sixth construction of the present invention, the concave reflecting mirror in each of the first to fourth constructions is formed by cutting work of aluminum.

As mentioned above, the image forming optical system for an equal speed scan in the optical scanner of the present invention has the concave reflecting mirror. Positive refracting power of this concave reflecting mirror in the cross scan-corresponding direction is reduced toward both end portions in the main scan-corresponding direction. The minimum portion of the curvature radius of the concave reflecting mirror is shifted in the main scan-corresponding direction. Therefore, converging actions of the deflected light beam become asymmetrical on plus and minus sides of a deflection angle.

The influences of sag are corrected by utilizing this asymmetry of these actions.

Concrete embodiments of the present invention will next be explained.

Figure 1B:
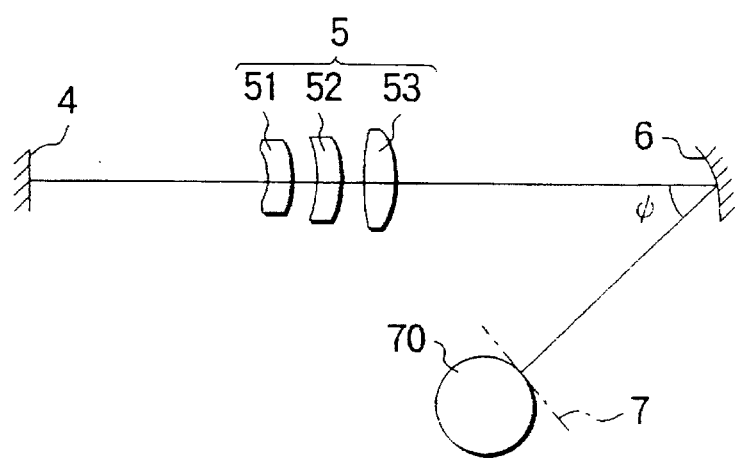

FIGS. 1a and 1b schematically show only a main portion of an optical scanner in accordance with one embodiment of the present invention. FIG. 1a is a view of the optical scanner seen from a direction of the rotating axis of a rotary polygon mirror. FIG. 1b is a view of an optical arrangement arranged after a deflecting reflecting face of the rotary polygon mirror and seen from a main scan-corresponding direction.

In FIG. 1a, for example, a light source device 1 is constructed by a semiconductor laser and a coupling lens. The coupling lens changes a divergent light beam from the semiconductor laser to a parallel light beam. Thus, the light source device 1 emits the parallel light beam.

The parallel light beam emitted from the light source device 1 is converged only in a cross scan-corresponding direction by a cylindrical lens 2 as an image forming element. This light beam is formed as a linear image extending in a main scan-corresponding direction in the vicinity of a deflecting reflecting face 4 of a rotary polygon mirror 3.

The light beam reflected on the deflecting reflecting mirror 4 is deflected at an equal angular velocity as the rotary polygon mirror 3 is rotated in an arrow direction. This light beam is incident to an image forming optical system for an equal speed scan as a periodic deflected light beam.

The image forming optical system for an equal speed scan has an fθ lens constructed by lenses 51, 52 and 53 and also has a concave reflecting mirror 6.

The deflected light beam is first transmitted through the fθ lens 5 and is reflected on the concave reflecting mirror 6 so that an optical path of the light beam is bent in the cross scan-corresponding direction. The light beam is then converged as a light spot on a scanned face 7 and optically scans the scanned face 7.

As shown in FIG. 1b, a photoconductive photosensitive drum 70 comes in contact with the scanned face 7 such that a generating line of the photosensitive drum 70 is directed to a main scanning direction. In other words, the scanned face 7 is a virtual plane coming in contact with the generating line of the photosensitive drum 7.

The concave reflecting mirror 6 has positive refracting power only in the cross scan-corresponding direction. Accordingly, the deflected light beam is converged on the scanned face 10 by only the fθ lens 5 with respect to the main scan-corresponding direction.

The fθ lens 5 has an fθ function in the main scan-corresponding direction so that the light spot is moved at an equal speed.

The deflected light beam is converged on the scanned face 7 by convergent actions of the fθ lens 5 and the concave reflecting mirror 6 with respect to the cross scan-corresponding direction.

Concrete examples of the image forming optical system for an equal speed scan will next be shown.

In the following description, $R_{iM}$ is set to a radius of curvature of an i-th face counted from a deflecting reflecting face side with respect to the main scan-corresponding direction. $R_{iS}$ is set to a radius of curvature of the i-th face counted from the deflecting reflecting face side with respect to the cross scan-corresponding direction. $D_i$ is set to a distance on the optical axis between the i-th face and an (i+1)-face. $N_j$ is set to a refractive index of a material of a j-th lens counted from the deflecting reflecting face side. $D_0$ is set to a distance on the optical axis from the deflecting reflecting face 4 to an incident side face of the lens 5.

Each of the following numeric values is a value relative to a focal length of the entire lens system in the main scan-corresponding direction when this focal length is normalized to 100.

| i | $R_{iM}$ | $R_{iS}$ | $D_i$ | j | $N_j$ |
|---|---|---|---|---|---|
| 0 | | | 14.903 | | |
| 1 | −21.636 | −21.636 | 2.258 | 1 | 1.58205 |
| 2 | −233.174 | −233.174 | 1.048 | | |
| 3 | −98.448 | −98.448 | 6.202 | 2 | 1.59670 |
| 4 | −28.694 | −28.694 | 0.482 | | |
| 5 | 394.022 | 394.022 | 5.780 | 3 | 1.59670 |
| 6 | −49.972 | −49.972 | 75.266 | | |
| 7 | ∞ | −75.771 | | | (concave reflecting mirror) |

An entire deflection angle $2\theta_0$ is set to 57 degrees (±28.5 degrees). An angle ψ shown in FIG. 1b is set to 60 degrees. As can be seen from these data, the fθ lens is a spherical lens.

Figure 4A:
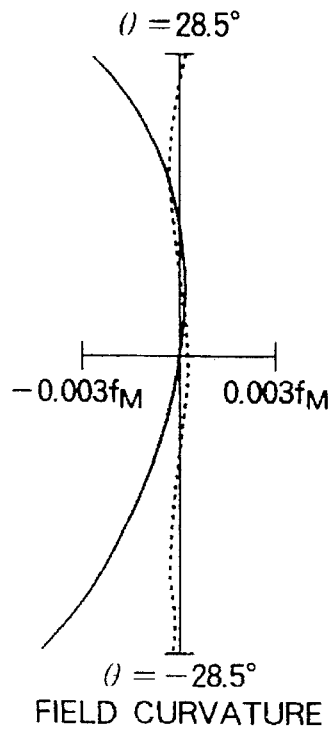
FIGS. 4a to 4c are diagrams for explaining disadvantages of the optical scanner caused when the present invention is not used.
Figure 4B:
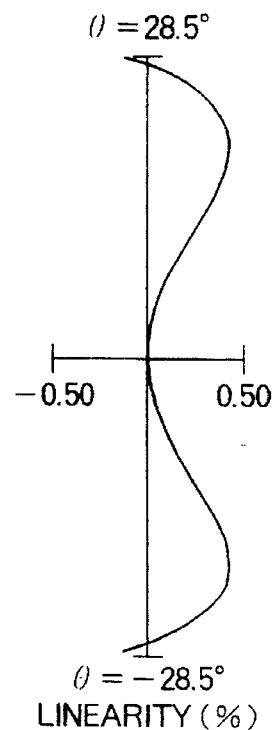

FIGS. 4a and 4b respectively show field curvature and linearity of an image when a curvature radius (−75.771) of the concave reflecting mirror 6 in the cross scan-corresponding direction is uniformly provided in the main scan-corresponding direction.

As is well known, linearity is defined as $$[\{dH_r(\theta)/dH_i(\theta)\}-1]\times100\ (\%)$$

when $H_i(\theta)$ is set to the height of an ideal image of the light spot at an deflection angle θ and $H_r(\theta)$ is set to the height of a real image. $H_i(\theta)$ shows an ideal position of the light spot in the main scanning direction. This linearity is a standard of the equal scanning speed.

As can be seen from field curvatures shown in FIG. 4a, field curvature in the main scanning direction shown by a broken line is preferably corrected, but field curvature in the cross scanning direction shown by a solid line is increased with the image height in a negative direction. Accordingly, when the optical scanning operation is performed by using such an optical system, the spot diameter in the cross scanning direction is increased with the image height so that it is impossible to perform a high density recording operation requiring high stability with respect to the spot diameter.

Therefore, the curvature radius $R_{7S}$ of the above concave reflecting mirror 6 in the cross scan-corresponding direction is changed at the deflection angle $\theta$ in accordance with the following formula of the second degree.

$$R_{7S} = -75.758 - 5.266 \times 10^{-4} . \theta^2$$

Figure 4C:
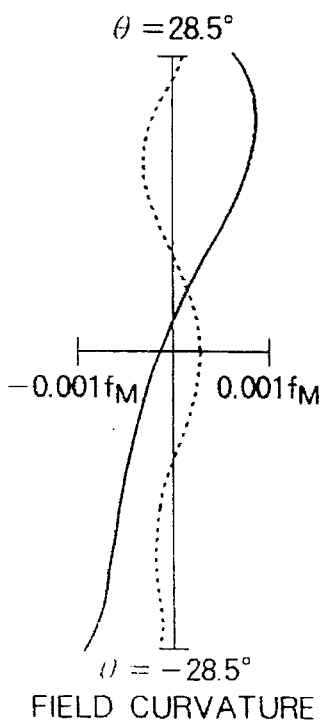

At this time, a portion of the concave reflecting mirror 6 minimizing its curvature radius in the cross scan-corresponding direction is a central portion of the concave reflecting mirror 6 in the main scan-corresponding direction. FIG. 4c shows field curvature when this central portion is arranged in conformity with the position of an optical axis of the fθ lens 5.

The concave reflecting mirror 6 takes no substantial converging action in the main scan-corresponding direction. Accordingly, field curvature and linearity in the main scanning direction are equal to those in FIGS. 4a and 4b. A scale on an axis of abscissa in FIG. 4c is different from that in FIG. 4a. Therefore, field curvature in FIG. 4c is emphasized in the main scanning direction in comparison with FIG. 4a.

The curvature radius of the concave reflecting mirror 6 in the cross scan-corresponding direction is set to be reduced in accordance with the deflection angle $\theta$. Therefore, positive refracting power of the concave reflecting mirror 6 in the cross scan-corresponding direction is weakened in a position in which the image height is high. Accordingly, as shown in FIG. 4c, field curvature in the cross scanning direction is effectively improved in comparison with FIG. 4a. However, no field curvatures on plus (+) and minus (−) sides of the deflection angle $\theta$ are symmetrical and a tendency to increase field curvature with the image height is left on the plus and minus sides.

This tendency is left since no shifts between the linear image and the deflecting reflecting face are symmetrical on the plus (+) and minus (−) sides of the deflection angle $\theta$ by the above-mentioned sag.

Therefore, the curvature radius $R_{7S}$ of the concave reflecting mirror 6 in the cross scan-corresponding direction is changed at the deflection angle $\theta$ in accordance with the following formula of the second degree.

$$R_{7S} = -75.758 - 5.266 \times 10^{-4} . \theta^2 + 4.163 \times 10^{-3} . \theta$$

Figure 2:
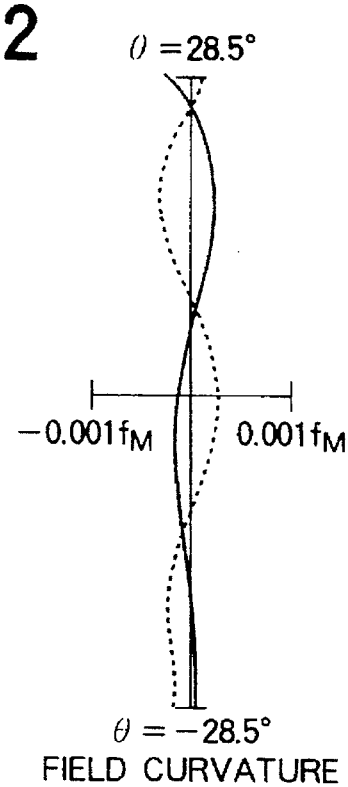
FIG. 2 is a diagram for explaining effects of an optical scanner in one embodiment of the present invention.

This formula of the second degree substantially shows a shape in which the previous formula of the second degree $$R_{7S} = -75.758 - 5.266 \times 10^{-4} . \theta^2$$

is shifted 3.953 degrees as the deflection angle $\theta$ on the plus side (on an upper side in FIG. 1a) in the main scanning direction. In this case, in accordance with the third construction of the present invention, a portion of the concave reflecting mirror 6 minimizing the curvature radius $R_{7S}$ (its minimum value −75.758) in the cross scan-corresponding direction is located in a position in which the deflection angle $\theta$ is shifted 3.953 degrees on the above plus side. As shown in FIG. 2a, the influences of sag are removed from field curvature in the cross scanning direction so that this field curvature is extremely preferably corrected. Field curvature and linearity in the main scanning direction are equal to those in FIGS. 4a to 4c.

In this example, the portion of the concave reflecting mirror 6 minimizing the curvature radius $R_{7S}$ (its minimum value −75.758) in the cross scan-corresponding direction is shifted from its central portion. However, the portion of the concave reflecting mirror 6 minimizing the curvature radius $R_{7S}$ (its minimum value −75.758) is located in a central portion of the concave mirror in its longitudinal direction in the case of the concave reflecting mirror in which curvature radius is changed in accordance with the following formula of the second degree mentioned above.

$$R_{7S} = -75.758 - 5.266 \times 10^{-4} . \theta^2$$

Accordingly, in the case of such a concave reflecting mirror, field curvature as shown in FIG. 2a is obtained as mentioned above when the concave reflecting mirror itself is shifted 3.953 degrees on the plus (+) side of the deflection angle $\theta$ in the main scan-corresponding direction as the longitudinal direction in accordance with the second construction of the present invention.

Field curvatures of the concave reflecting mirror shown in FIGS. 1a and 1b in the cross scan-corresponding direction may be set to be asymmetrical on the plus (+) and minus (−) sides of the deflection angle as in the fourth construction of the present invention.

For example, the field curvature $R_{7S}$ is changed on the plus (+) side of the deflection angle $\theta$ in accordance with the following formula of the second degree.

$$R_{7S} = -75.758 - 4.208 \times 10^{-4} . \theta^2$$

Further, the field curvature $R_{7S}$ is changed on the minus (−) side of the deflection angle $\theta$ in accordance with the following formula of the second degree.

$$R_{7S} = -75.758 - 6.272 \times 10^{-4} . \theta^2$$

In this case, converging actions of the concave reflecting mirror 6 in the cross scan-corresponding direction are asymmetrically taken on the plus (+) and minus (−) sides of the deflection angle $\theta$ so that the influences of sag can be effectively removed.

Figure 3:
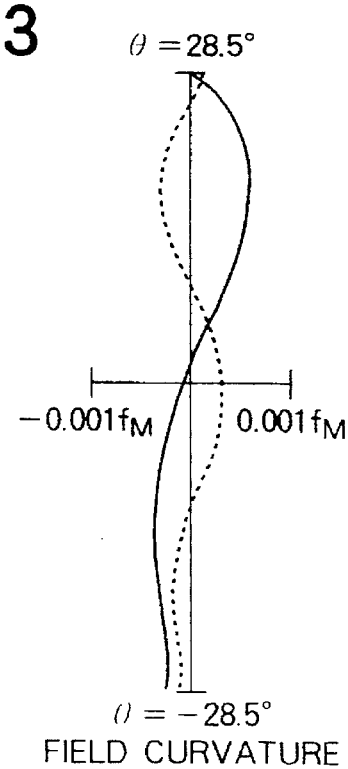
FIG. 3 is a diagram for explaining effects of an optical scanner in another embodiment of the present invention.

FIG. 3 shows field curvature when the above portion of the concave reflecting mirror providing the minimum value −75.758 of curvature radius is set to be in conformity with an optical axis of the fθ lens. Similar to the case of FIG. 2, field curvature in the cross scanning direction is preferably corrected.

Effects of this correction of the field curvature can be further improved by shifting the entire concave reflecting mirror in this embodiment in the main scanning direction.

As mentioned above, the present invention can provide a novel optical scanner. Since this optical scanner has the above construction, the influences of sag caused by using the rotary polygon mirror as an optical deflector are effectively removed so that field curvature can be preferably corrected. Accordingly, it is possible to realize a preferable optical scanning operation having high stability with respect to the diameter of a light spot.

In each of the fifth and sixth constructions of the present invention, the concave reflecting mirror can be easily processed in a processing shape difficult to be obtained in the case of glass. In particular, in the fifth construction, the concave reflecting mirror can be easily manufactured by a plastic material in large quantities by injection molding.

A molding size of the concave reflecting mirror is limited in the case of the injection molding. However, a degree of freedom in design with respect to the size of an optical system is increased by manufacturing the concave reflecting mirror by cutting work of aluminum as in the sixth construction of the present invention.

In the present invention, curvature radius with respect to the deflection angle is changed in accordance with a formula of the second degree. However, when the curvature radius is changed in accordance with the formula of an even degree such as the fourth degree, the sixth degree, etc., the field curvature in the cross scanning direction can be effectively corrected by optimizing this formula.

Many widely different embodiments of the present invention may be constructed without departing from the spirit and scope of the present invention. It should be understood that the present invention is not limited to the specific embodiments described in the specification, except as defined in the appended claims.

What is claimed is:

1. An optical scanner in which a parallel light beam from a light source device is formed by an image forming element as a linear image extending in a main scan-corresponding direction and is deflected at an equal angular velocity by a rotary polygon mirror having a deflecting reflecting face in the vicinity of said linear image; and the deflected light beam is converged as a light spot on a scanned face by an image forming optical system for an equal speed scan to perform an optical scanning operation at an equal speed;

the optical scanner being constructed such that said image forming optical system for an equal speed scan has an fθ lens having an fθ function in the main scan-corresponding direction and converging the deflected light beam onto the scanned face in the main scan-corresponding direction;

the image forming optical system also has a concave reflecting mirror having positive refracting power only in a cross scan-corresponding direction and converging the deflected light beam onto the scanned face in the cross scan-corresponding direction in cooperation with said fθ lens;

a radius of curvature of said concave reflecting mirror in the cross scan-corresponding direction is increased from a central region thereof toward both end portions of the concave reflecting mirror in a longitudinal direction thereof in accordance with a predetermined formula of the second degree at a deflection angle θ of the deflected light beam deflected by said rotary polygon mirror; and a portion of the concave reflecting mirror minimizing said curvature radius is shifted by a predetermined distance in a predetermined direction from the position of an optical axis of the fθ lens in the main scan-corresponding direction so as to correct field curvature in a cross scanning direction along an effective scanning region.

2. An optical scanner as claimed in claim 1, wherein the portion of the concave reflecting mirror minimizing the curvature radius is a central portion in the longitudinal direction and a position of this central portion is shifted by the predetermined distance in the predetermined direction from the position of the optical axis of the fθ lens in the main scan-corresponding direction.

3. An optical scanner as claimed in claim 1, wherein a formula of the second degree representing a change in curvature radius of the concave reflecting mirror includes a first degree term;

the portion of the concave reflecting mirror minimizing the curvature radius is shifted by the predetermined distance in the predetermined direction from a central portion of the concave reflecting mirror in the longitudinal direction; and the central portion in the longitudinal direction is arranged in conformity with the optical axis of the fθ lens.

4. An optical scanner in which a parallel light beam from a light source device is formed by an image forming element as a linear image extending in a main scan-corresponding direction and is deflected at an equal angular velocity by a rotary polygon mirror having a deflecting reflecting face in the vicinity of said linear image; and the deflected light beam is converged as a light spot on a scanned face by an image forming optical system for an equal speed scan to perform an optical scanning operation at an equal speed;

the optical scanner being constructed such that said image forming optical system for an equal speed scan has an fθ lens having an fθ function in the main scan-corresponding direction and converging the deflected light beam onto the scanned face in the main scan-corresponding direction;

the image forming optical system also has a concave reflecting mirror having positive refracting power only in a cross scan-corresponding direction and converging the deflected light beam onto the scanned face in the cross scan-corresponding direction in cooperation with said fθ lens;

a radius of curvature of said concave reflecting mirror in the cross scan-corresponding direction is increased from a central region thereof toward both end portions of the concave reflecting mirror in a longitudinal direction thereof in accordance with a predetermined formula of the second degree at a deflection angle θ of the deflected light beam deflected by said rotary polygon mirror; and changes in curvature radius of said concave reflecting mirror in the longitudinal direction provided in accordance with a formula of the second degree are asymmetrical on right-hand and left-hand sides with a minimum portion of the curvature radius as a boundary.

5. An optical scanner as claimed in claim 4, wherein the concave reflecting mirror has a reflecting face formed in a concave surface portion of a base formed by plastic.

6. An optical scanner as claimed in claim 4, wherein the concave reflecting mirror is formed by cutting work of aluminum.

* * * * *